United States Patent Office 2,964,398
Patented Dec. 13, 1960

2,964,398
QUATERNARY BRAZING ALLOY
David Wade Rhys, Hounslow, England, assignor to The International Nickel Company, Inc., New York, N.Y., a corporation of Delaware
No Drawing. Filed July 17, 1958, Ser. No. 749,071
Claims priority, application Great Britain Oct. 1, 1957
2 Claims. (Cl. 75—159)

The present invention relates to brazing and, more particularly, to brazing alloys or solders adapted to be used in joining metal parts into articles exposed in use to elevated temperatures.

It is well known that in the brazing of metal parts to form articles subjected in use to temperatures of 550° C. and above, for example, up to about 900° C., it is necessary to use a brazing alloy which will give a strong joint at these temperatures. The alloys commonly used in the past for this purpose have been base-metal compositions but these tend to react readily with the parent alloys, i.e., the alloys to be joined together. In consequence they flow sluggishly and do not readily make well-filled joints.

Considerable improvement is obtained with nickel-palladium-manganese alloys, which flow readily and form joints which are strong at high temperatures. A brazing alloy is, however, commonly required in the form of wire, foil or the like because in such a form it can be easily applied in the requisite amount and in the correct location. Now the nickel-palladium-manganese alloys are difficult to work into wire, foil or the like. With difficulty they can be so worked, but the wear on the tools is considerable.

Silver-palladium-manganese alloys are also better as brazing alloys than the aforementioned base-metal alloys, but suffer from a tendency to lose palladium and manganese into the parent alloys by diffusion, leaving a comparatively weak, silver-rich layer in the joint. Although attempts were made to overcome the foregoing difficulties and other disadvantages, none, as far as I am aware, was entirely successful when carried into practice commercially on an industrial scale.

It has now been discovered that by the use of a special soldering technique involving the use of a special solder the aforementioned disadvantages may be overcome.

It is an object of the invention to provide an improved, easily workable soldering alloy characterized by improved resistance to shear at elevated temperatures when employed in a joint, said alloy having requisite wetting and flowing properties and having a melting point of not less than about 1000° C. nor more than about 1250° C.

Another object of the invention is to provide a method of successfully and satisfactorily soldering heat resistant, chromium-containing alloys, such as nickel-chromium and nickel-chromium-iron alloys, wherein the soldered joint is characterized by improved mechanical properties at elevated temperatures, particularly improved resistance to shear.

It is a further object of the invention to provide a fabricated structural gas turbine assembly comprised of a plurality of heat resistant chromium-containing alloy members united by a solder joint comprised of a special joining alloy, the joined portions of the members having an improved combination of properties at elevated temperatures as comppared to joined portions produced with conventional joining alloys.

The invention also provides a fabricated gas turbine structure comprising members of a chromium-containing alloy, such as nickel-chromium and nickel-chromium-iron alloys, united by one or more solder joints comprised of a special joining alloy, said structure being characterized by high mechanical strength, high creep resistance and by improved resistance to oxidation and to scaling at elevated temperatures of the order of about 550° C. to 900° C.

Still another object of the invention is to provide a fabricated gas turbine blade comprised of members of a chromium-containing alloy, e.g., nickel-chromium and nickel-chromium-iron alloys, united by one or more solder joints containing a special soldering alloy, said turbine blade being characterized by high mechanical strength and by improved resistance to creep, to oxidation and to scaling at elevated temperatures of the order of about 550° C. to 900° C.

The invention also contemplates providing a fabricated hollow blade structure for gas turbines comprising members of a chromium-containing alloy, such as nickel-chromium and nickel-chromium-iron alloys, united by a joint comprised of a special joining alloy, said hollow blade structure being characterized by high mechanical strength and by improved resistance to creep, to shear, to oxidation and to scaling at elevated temperatures of the order of about 550° C. to 900° C.

Generally speaking, the present invention is based on the surprising discovery that certain quaternary alloys are superior to any of the existing alloys for the purpose in question. According to the invention, these alloys contain from 10% to 60% copper, from 10% to 50% nickel and from 1% to 30% manganese. The balance (except for impurities up to about 2%) is palladium and the palladium content is at least 10%. The alloys within the aforementioned range of composition are readily worked without damage to the tools into the required forms such as wire, sheet, strip, etc., so that the solder can be placed in situ between the parts to be joined. The alloys according to the invention melt at a temperature of the order of about 1000° C. to about 1250° C., have good flowing and wetting characteristics when molten and have a decreased tendency to react with the constituents of alloy parts to be joined. Thus, the solders of the present invention have a minimized tendency to react with such elements as nickel, chromium, molybdenum, etc. Further, the alloys of the present invention are characterized by a low potential for diffusion into high-temperature heat-resisting alloy components. The effect of this low potential is that the rate of diffusion of the constituents of the novel solder of the present invention into the joined components at elevated temperatures is substantially lower than the diffusion rate encountered when prior alloys such as discussed hereinbefore are used.

In carrying the invention into practice, it is advantageous to maintain the ranges of copper, nickel, manganese and palladium within the limits set forth in the following tabulation:

| Element: | Percent |
|---|---|
| Copper | 35–60 |
| Nickel | 15–20 |
| Manganese | 1–15 |
| Palladium | Balance about 10–30 |

Examples of alloys according to the invention, together with their liquidus and solidus temperatures, are as follows:

| No. | Composition | | | | Liquidus, ° C. | Solidus, ° C. |
|---|---|---|---|---|---|---|
| | Percent Copper | Percent Palladium | Percent Nickel | Percent Manganese | | |
| 1 | 49 | 30 | 20 | 1 | 1,180 | 1,160 |
| 2 | 45 | 30 | 20 | 5 | 1,162 | 1,120 |
| 3 | 40 | 30 | 20 | 10 | 1,124 | 1,085 |
| 4 | 35 | 30 | 20 | 15 | 1,083 | 1,055 |
| 5 | 60 | 20 | 15 | 5 | 1,147 | 1,105 |
| 6 | 55 | 20 | 15 | 10 | 1,090 | 1,035 |

Examples of strength at different temperatures of joints made between parts of nickel-chromium-cobalt alloys by alloys Nos. 4 and 6 are given below:

| Temperature, ° C. | Shear Strength—Long Tons/sq. in. | |
| --- | --- | --- |
| | Alloy No. 4 | Alloy No. 6 |
| 600 | | 10.6 |
| 700 | | 10.3 |
| 750 | 7.6 | 8.9 |
| 800 | | 7.2 |
| 850 | 7.4 | 7.2 |

The invention includes the brazing of parts with the use of these quaternary alloys to form articles subjected in use to temperatures of 550° C. and above, though not, of course, to a temperature above the solidus temperature of the brazing alloy. These parts such as turbine blade components, hollow turbine blade components, turbine rotors, turbine stators, etc., commonly consist of alloys which (by reason of the presence of chromium, aluminum, titanium or other elements) tend to form coherent tenacious and refractory oxide films on their surfaces and so are resistant to scaling at high temperatures of the order of about 550° C. to about 900° C. Examples are alloys consisting predominantly of nickel, or nickel plus cobalt, with at least 5% chromium and with or without other elements such in particular as iron, titanium, aluminum and molybdenum; and austenitic chromium-containing steels, e.g., those of the 18% chromium—8% nickel type. The alloys can also be used with advantage for joining nickel-molybdenum creep-resisting alloys, tungsten and molybdenum. It will be understood that the parts to be joined may be of identical alloys or metals, or that one may be of one of these alloys or metals and the other of another of these alloys or metals.

The refractory oxide films formed by most of these alloys may be removed to enable a good joint to be formed by effecting the brazing with a flux of borax, boric acid or a mixture of borax and boric acid in a hydrogen atmosphere. The parts are then subjected to a temperature in excess of about 1000° C. and below the melting point of the components to be joined while in mutual contact with the solder of the present invention in order to effect the joining thereof. The parts are then cooled, for example, to below about 900° C. while maintaining the components in fixed relationship.

It is an advantgae of the alloys used according to the invention that the clearance between the parts to be joined is not critical; not only do the alloys flow well when molten through capillary openings, but they will also fill large openings, so it is not necessary in preparing the surfaces to be joined to make them mate with one another exactly.

It is a further advantage that these alloys are better adapted to vacuum brazing because at their flowing temperatures they have a lesser tendency to volatilize under vacuum than the prior alloys.

It is to be observed that the present invention provides a joining alloy and a method for the production of fabricated gas turbine sub-assemblies or structures made of parts of chromium-containing or molybdenum-containing alloys, such as nickel-chromium, nickel-chromium-iron and nickel-molybdenum alloys, united by a joint comprised of the joining alloy containing copper, nickel, manganese and palladium as essential elements, whereby the united metal parts or members can be successfully and satisfactorily used at high service temperatures of the order of about 550° C. to about 900° C.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. An easily workable solder characterized by an improved combination of properties, including good wetting and flowing properties in contact with chromium-containing metals, oxidation resistance, creep resistance, mechanical strength and having a low diffusion potential, for joining parts made of chromium-containing heat-resisting alloys into gas turbine structures and the like, which comprises an alloy containing about 10% to about 60% copper, about 10% to about 50% nickel, about 1% to about 30% manganese and the balance, at least about 10%, palladium.

2. An easily workable solder characterized by an improved combination of properties, including good wetting and flowing properties in contact with chromium-containing metals, oxidation resistance, creep resistance, mechanical strength and having a low diffusion potential, for joining parts made of chromium-containing heat-resisting alloys into gas turbine structures and the like, which comprises an alloy containing about 35% to about 60% copper, about 15% to about 20% nickel, about 1% to about 15% manganese and the balance between 10% and 30% palladium.

References Cited in the file of this patent

UNITED STATES PATENTS

| | | |
| --- | --- | --- |
| 1,935,897 | Wise | Nov. 21, 1933 |
| 2,654,946 | Rhodes | Oct. 13, 1953 |
| 2,729,881 | Stumbock | Jan. 10, 1956 |
| 2,815,282 | Rhodes | Dec. 3, 1957 |
| 2,844,867 | Wernz | July 29, 1958 |